United States Patent [19]

Brandon et al.

[11] 4,253,392

[45] Mar. 3, 1981

[54] HOLLOW FUSER ROLL WITH VARIABLE TAPER

[75] Inventors: Fred Y. Brandon, Lexington, Ky.; Jack P. Chang, Boulder, Colo.; William D. Clark, Longmont, Colo.; Eugene G. Stahlberg, Boulder, Colo.

[73] Assignee: International Business Machines Corporation, Armonk, N.Y.

[21] Appl. No.: 27,951

[22] Filed: Apr. 9, 1979

[51] Int. Cl.$^{3}$ ........................ B30B 3/00; B02C 11/08; B60B 9/00; B21B 7/02

[52] U.S. Cl. .................................. 100/155 R; 29/117; 29/122; 100/93 RP; 219/216; 428/36

[58] Field of Search ............. 29/117, 122; 100/93 RP, 100/155 R; 219/469, 216; 226/190; 432/60; 428/36

[56] References Cited

U.S. PATENT DOCUMENTS

| | | | |
|---|---|---|---|
| 3,883,293 | 5/1975 | McCarroll | 432/60 |
| 3,884,623 | 5/1975 | Slack | 219/216 |
| 3,999,038 | 12/1976 | Sikes, Jr. et al. | 219/216 |
| 4,042,804 | 8/1977 | Moser | 432/60 |

OTHER PUBLICATIONS

Fathergill et al., "IBM Technical Disclosure Bulletin", vol. 16, #3, Aug. 1973.

*Primary Examiner*—William R. Dixon

*Attorney, Agent, or Firm*—Charles E. Rohrer

[57] ABSTRACT

An electrophotographic copier machine with a roll fuser where one of the mating rolls is comprised of a thin outer shell which takes a variable taper so that a concave shape is produced under high humidity conditions and a relatively straight roller is produced under low humidity conditions. Means for changing the support at the roll ends is provided to produce the variable taper. End plugs can be moved axially inward at high humidity to provide support for the end portions of the normally concave roll and can be moved axially outwardly under low humidity such that no support is provided until the roll ends are flattened under the pressure of a mating roll.

3 Claims, 6 Drawing Figures

HOLLOW FUSER ROLL WITH VARIABLE TAPER

This invention relates to electrophotographic copier machines and more particularly to roll fusers used for permanently impressing a developed image onto the copy paper.

BACKGROUND OF THE INVENTION

A common type of electrophotographic copier machine calls for exposing an original document to produce an image on a photoreceptive medium. The image is then developed by placing toning material on the photoreceptive medium, and if the photoreceptive medium is not also the copy paper, the developed image must be transferred to copy paper.

In order to produce a finished copy, the toning material is bonded to the copy paper in a permanent manner. One satisfactory device to accomplish bonding is to send the paper through the nip of a pair of fusing rollers whereat pressure and usually heat are applied to fuse the image onto the copy paper.

A well-known problem of the roll fuser has been the tendency of copy paper to wrinkle under high humidity conditions. To remedy that problem, it has been suggested in the prior art that a taper be provided on one of the rolls so as to produce a concave roller. The object of the taper is to produce a higher peripheral speed near the edge of the roller so that as copy paper passes through the nip of the mating rollers the peripheral speed at the edge is greater than it is in the middle. As a result, the paper tends to stretch and does not wrinkle even under high humidity conditions.

Unfortunately, while a tapered roller alleviates the wrinkling problem, it makes worse the smearing problem which is encountered under very dry conditions. At dry conditions copy paper tends to crinkle or have small waves in it so that as the copy paper enters the fuser, premature contact with the fusing roll creates a smearing of the image. Both the wrinkling problem and the smearing problem are more severe for lightweight papers.

It is the general object of this invention to provide a roll fuser through which, by proper adjustment, the problem of wrinkling of copy paper can be eliminated at high humidity conditions and the problem of smearing can be eliminated at low humidity conditions.

SUMMARY OF THE INVENTION

This invention provides an electrophotographic copying machine with a variable taper fusing roll so that a tapered roll can be provided at high humidity conditions and a relatively straight untapered roll can be provided under dry conditions.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

Figure 1:
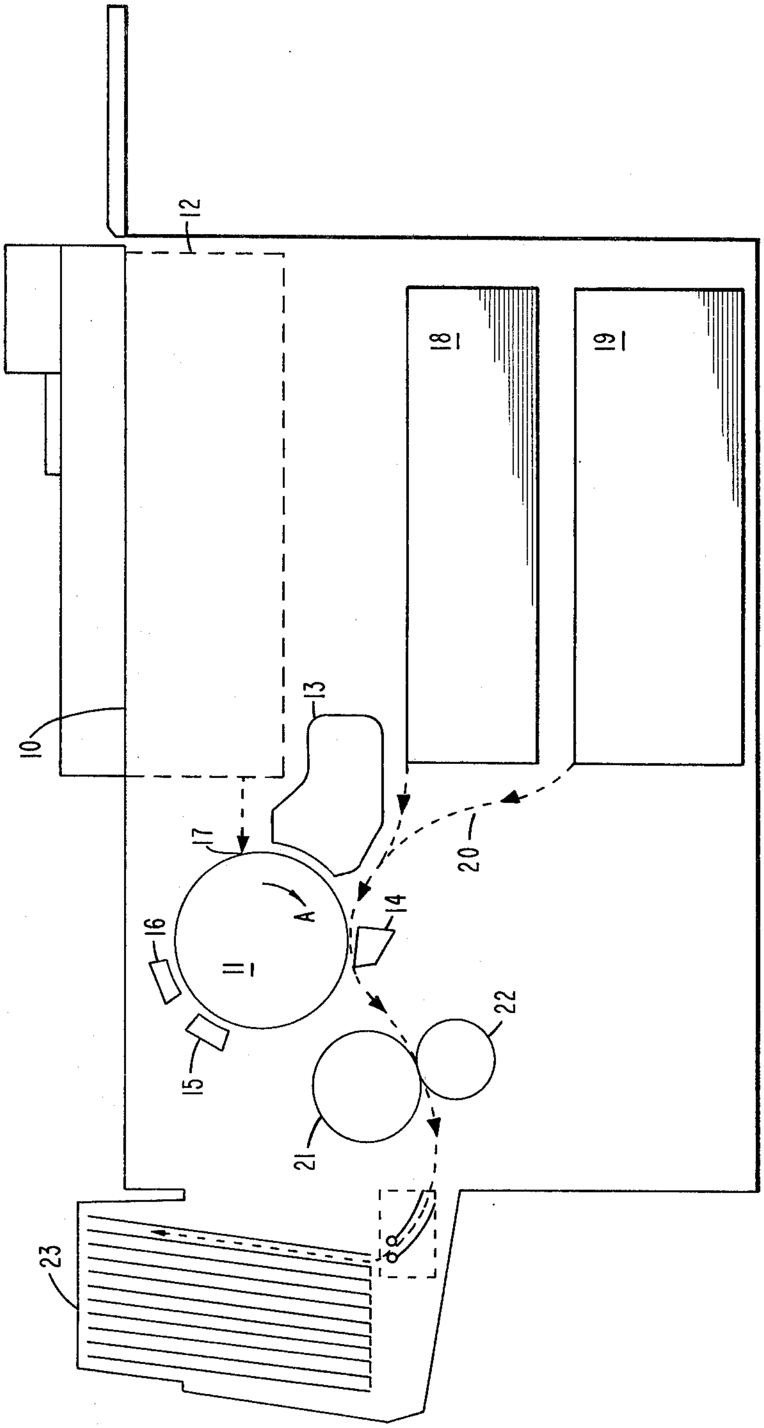
FIG. 1 shows the paper path of a typical electrophotographic copier machine.

FIG. 1 shows a viewing platen 10 upon which an original document is placed in order to form an image thereof on rotating photoreceptive drum 11 through the operation of an optics module 12. An image placed on photoreceptive drum 11 is developed by the developer/cleaner mechanism 13 for transfer to copy paper at the transfer corona 14. As the photoreceptive drum 11 continues to rotate in direction A, it comes under the influence of a preclean corona 15 which prepares the surface of the drum for a cleaning operation by the developer/cleaner mechanism 13. On subsequent rotations of the drum the photoreceptive material is charged by the charging corona 16 in preparation for receiving a second image at the exposure station 17.

Copy paper is moved from either bin 18 or bin 19 along the path 20 to the transfer station where the image is transferred from the photoreceptive drum 11 to the copy paper under the influence of transfer corona 14. The copy paper then continues to follow a path 20 until it enters the nip of the fusing rolls 21 and 22. The fusing rolls permanently impress the developed image onto the copy paper which then proceeds into the collator 23.

Figure 2:
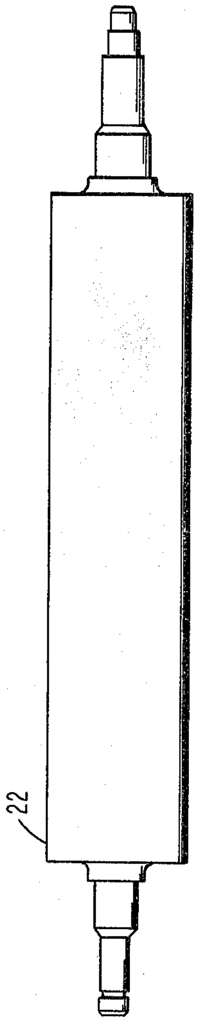
FIG. 2 shows an embodiment of a backup roll with a variable taper.
Figure 2A:
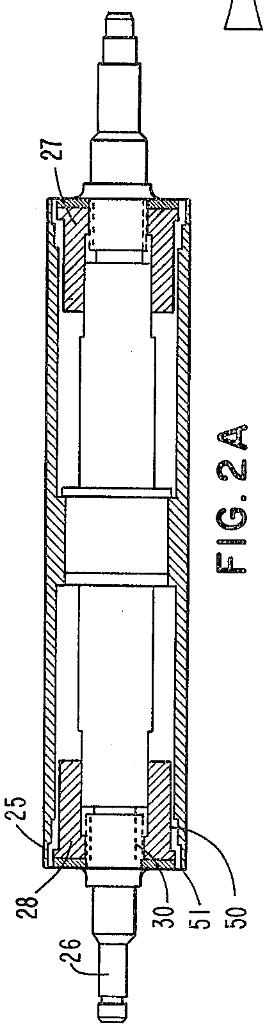
FIG. 2A shows the roll of FIG. 2 with the end plug axially outward.
Figure 2B:
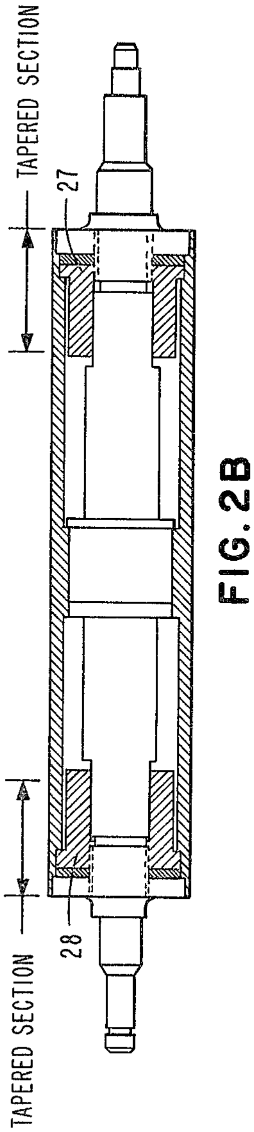
FIG. 2B shows the roll with the end plug axially inward.

FIG. 2 shows an external view of the backup roll 22 while FIGS. 2A and 2B are cross-sectional views showing the interior of roll 22. The roll is comprised of a thin outside shell 25 which is mounted on a shaft 26. Shell 25 contains a tapered section at each end thereof as shown in FIGS. 2A and 2B. End plugs 27 and 28 are shown at each end of shell 25 and are movably mounted in an axial direction on threads 30. In FIG. 2A plugs 27 and 28 are in a retracted position while in FIG. 2B these plugs have been moved axially toward each other, i.e., toward the center of shell 22. The outer surface 50 of plugs 27 and 28 provides a close fit with the inner surfaces of the end shoulders of shell 22, such that when the plugs 27 and 28 are screwed in as shown in FIG. 2B, the end portion of thin shell 25 is mechanically supported at each end. In that manner the shell 25 maintains its normally tapered configuration even when pressed against mating fusing roll 21 (FIG. 1). On the other hand, when the end plugs 27 and 28 are screwed outwardly to the position shown in FIG. 2A no mechanical support is provided to shell 25 by the end plugs until the pressure of mating roll 21 forces the tapered end sections of shell 25 into a flattened condition eliminating gap 51. The amount of taper and the size of gap 51 are coordinated such that the flattened condition of shell 25 results in an essentially straight, i.e., non-tapered roll.

Figure 3:
FIG. 3 shows the roll footprint for FIG. 2A.
Figure 4:
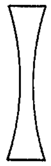
FIG. 4 shows the roll footprint for FIG. 2B.

Thus, there has been provided a normally tapered roll 22 whose tapered configuration is maintained when end plugs 27 and 28 are screwed axially inwardly and which roll substantially eliminates the problem of wrinkling copy paper under high humidity conditions. The tapered nature of the footprint of roll contact between rolls 21 and 22 is shown in FIG. 4. There has also been provided an essentially straight roll 22 whose tapered configuration has been flattened when end plugs 27 and 28 are screwed axially outwardly and which roll substantially eliminates the problem of smearing copy under dry conditions. The essentially straight nature of the footprint of roll contact between rolls 21 and 22 is shown in FIG. 3.

It has been found that with plugs 27 and 28 moved axially inwardly as far as possible, the tapered backup roll 22 is effective in producing good quality copy from high humidity conditions downwardly to at least 30 percent relative humidity. It was determined that a satisfactory taper was 0.071 mm. When very dry conditions are encountered, the straight backup roll is needed and is effective in producing quality copy from very dry conditions upwardly to about 50 percent relative humidity. Thus, the provision of end plugs 27 and 28 creates a fusing roller with a variable taper which enables high quality fusing regardless of the conditions under which the copier is used. Automatic adjustment of plugs 27 and 28 can be obtained by driving them with a motor under control of a humidistat.

It is noted that it may be possible to use various means for changing the support at the roll ends in order to produce variable taper. For example, a hygroscopic material such as "Nylon" expands under high humidity conditions and a heat sensitive material such as "Ryton" expands under application of heat. While experimentation with these materials has not commenced, they provide the possibility of automatic adjustment of roll taper without mechanical movement.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A roll fuser for an electrophotographic copier machine for bonding a developed image to copy-receiving material comprising:

a tapered first roll with end portions radially expanded relative to roll center, said first roll mounted on a shaft for rotation and comprised of a hollow thin outer shell centrally supported on said shaft but not supported at the radially expanded end portions;

a second roll mounted for a mating relationship with said first roll; and means for pressing together said first and second rolls such that said radially expanded end portions may be flattened when said rolls are pressed together.

2. The roll fuser of claim 1 further including movable supporting means mounted on said shaft in a first position for radially supporting said end portions when said rolls are pressed together.

3. The roll fuser of claim 2 wherein said movable supporting means in a second position provides support for said end portions at all times.

* * * * *